US007346804B2

(12) United States Patent
Forrer, Jr. et al.

(10) Patent No.: US 7,346,804 B2
(45) Date of Patent: Mar. 18, 2008

(54) HARD DISK DRIVE DATA SCRUB METHODOLOGY

(75) Inventors: Thomas R. Forrer, Jr., Round Rock, TX (US); Jason Eric Moore, Austin, TX (US); Abel Enrique Zuzuarregui, Paige, TX (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 10/948,415

(22) Filed: Sep. 23, 2004

(65) Prior Publication Data

US 2006/0075288 A1   Apr. 6, 2006

(51) Int. Cl.
*G05F 11/00* (2006.01)

(52) U.S. Cl. .......................................... 714/5; 711/114

(58) Field of Classification Search ...................... None
See application file for complete search history.

(56) References Cited

U.S. PATENT DOCUMENTS

| 5,267,242 | A | * | 11/1993 | Lavallee et al. ................ 714/7 |
| 5,632,012 | A | * | 5/1997 | Belsan et al. ................... 714/6 |
| 6,076,183 | A | * | 6/2000 | Espie et al. ................... 714/764 |
| 6,101,614 | A | * | 8/2000 | Gonzales et al. ............... 714/6 |
| 6,480,982 | B1 | * | 11/2002 | Chan et al. ................... 714/764 |
| 6,715,116 | B2 | * | 3/2004 | Lester et al. ................. 714/718 |
| 6,832,340 | B2 | * | 12/2004 | Larson et al. ................. 714/42 |
| 6,848,063 | B2 | * | 1/2005 | Rodeheffer et al. ............ 714/6 |
| 6,851,070 | B1 | * | 2/2005 | Rodrigues et al. ............. 714/5 |
| 7,137,038 | B2 | * | 11/2006 | New et al. ..................... 714/42 |
| 7,165,188 | B1 | * | 1/2007 | Rodrigues et al. ............. 714/5 |
| 2001/0047497 | A1 | * | 11/2001 | Larson et al. ................. 714/42 |
| 2004/0268179 | A1 | * | 12/2004 | Stewart ......................... 714/8 |
| 2005/0028048 | A1 | * | 2/2005 | New et al. ..................... 714/54 |
| 2005/0071557 | A1 | * | 3/2005 | Kawamura et al. ......... 711/114 |
| 2005/0262385 | A1 | * | 11/2005 | McNeill et al. ................ 714/5 |
| 2005/0283655 | A1 | * | 12/2005 | Ashmore ........................ 714/7 |

OTHER PUBLICATIONS

U.S. Appl. No. 10/948,442, Forrer, Jr. et al. Hard Disk Drive Background Scrub Methodology, filed Sep. 23, 2004.

* cited by examiner

*Primary Examiner*—Christopher McCarthy
*Assistant Examiner*—Robert Beausoliel
(74) *Attorney, Agent, or Firm*—Duke W. Yee; Diana R. Gerhardt; Wayne P. Bailey

(57) ABSTRACT

Method, system and computer program product for reporting and recovering from uncorrectable data errors in a data processing system using the Advanced Technology Attachment (ATA) or the Serial ATA (SATA) protocol. The invention utilizes the data scrubbing functionality of SCSI hard drives to provide a higher level of data integrity in an operating system implemented RAID environment. If an uncorrectable data error is found on a hard drive during a background data scrubbing operation, information concerning the data error is logged in a S.M.A.R.T. (Self Monitoring Analysis and Reporting Technology) error data structure. When the host operating system identifies the uncorrectable data error during normal operation, a Host Array Manager issues a Write Command to write the data from a redundant drive after the defective Logical Block Address (LBA) has been reassigned.

8 Claims, 2 Drawing Sheets

HARD DISK DRIVE DATA SCRUB METHODOLOGY

CROSS REFERENCE TO RELATED APPLICATION

The present application is related to application entitled "HARD DISK DRIVE BACKGROUND SCRUB METHODOLOGY", Ser. No. 10/948,442, filed on even date herewith. The above related application is assigned to the same assignee as the present application and is incorporated herein by reference.

BACKGROUND OF THE INVENTION

1. Technical Field

The present invention relates generally to the data processing field and, more particularly, to a method, system and computer program product for reporting and recovering from uncorrectable data errors in a data processing system having an operating system implemented RAID environment and using the Advanced Technology Attachment (ATA) or the Serial ATA (SATA) protocol.

2. Description of Related Art

Data processing systems are often arranged with redundant data storage in order to permit recovery of lost data, for example, from damaged media. Currently, RAID (Redundant Array of Independent Disks) controllers initiate background read operations on attached hard drives in order to find locations on the media that may have been damaged, causing either hard data errors or recoverable data errors that require significant levels of Error Recovery. This functionality is called data scrubbing. If a hard error is encountered during data scrubbing, the bad Logical Block Address (LBA) is reassigned and when the drive is a member of a RAID configuration (other than RAID 0), any lost data can be recreated and rewritten. Thus RAID data redundancy is maintained. This is usually accomplished transparent to the operating system (OS), application programs, and the user.

When a hard drive is attached to a host via a "just a bunch of disks (JBOD) host bus adapter, the adapter does not initiate this background data scrubbing activity. When JBOD drives are configured as RAID arrays where the RAID functionality is provided by the host CPU and the OS, rather than by using a RAID adapter, the background scrubbing functionality is usually not included. This is mainly because significant system resources would be consumed to perform background data scrubbing on all the hard drive resources attached to the system. Thus, in a system configuration where the OS provides RAID functionality (e.g., acts as a RAID controller), if a drive in the RAID array fails followed by encountering a hard media error during the rebuild process, the rebuild will fail because the array was already running exposed (i.e., with no redundancy). For example, this can occur when using the IBM Advanced Interactive Operating system (AIX) Mirroring (RAID1) that is used on an IBM eServer pSeries System. Further, some errors are not discovered during normal operation because a hard error may occur in an LBA containing infrequently used data. In such cases a maintenance window has to be scheduled reasonably quickly so that the system can be brought down and a RAID 1 array can be recreated from backup tapes. Such issues are unacceptable in systems requiring high reliability.

The above-referenced related application describes mechanisms for reporting and recovering from uncorrectable data errors in a data processing system in which the hard drive is connected to the system using the Small computer System Interface (SCSI) protocol. It would be desirable to provide a mechanism for reporting and recovering from uncorrectable data errors in a data processing system in which the hard drive is connected to the system using the Advanced Technology Attachment (ATA) or the Serial ATA (SATA) protocol.

SUMMARY OF THE INVENTION

The present invention provides a method, system and computer program product for reporting and recovering from uncorrectable data errors in a data processing system using the Advanced Technology Attachment (ATA) or the Serial ATA (SATA) protocol. The invention utilizes the data scrubbing functionality of SCSI hard drives to provide a higher level of data integrity in an operating system implemented RAID environment.

If an uncorrectable data error is found on a hard drive during a background data scrubbing operation, information concerning the data error is logged in a S.M.A.R.T. (Self Monitoring Analysis and Reporting Technology) error data structure. When the host operating system identifies the uncorrectable data error during normal operation, a Host Array Manager issues a Write Command to write the data from a redundant drive after the defective Logical Block Address (LBA) has been reassigned.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
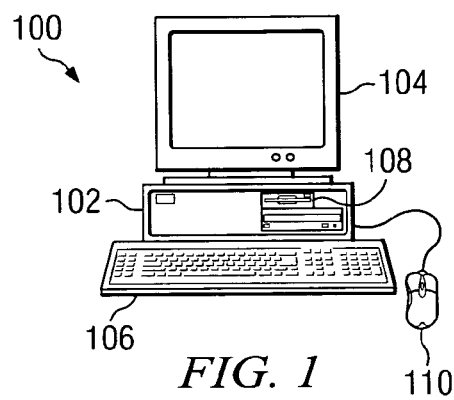
FIG. 1 is a pictorial representation of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
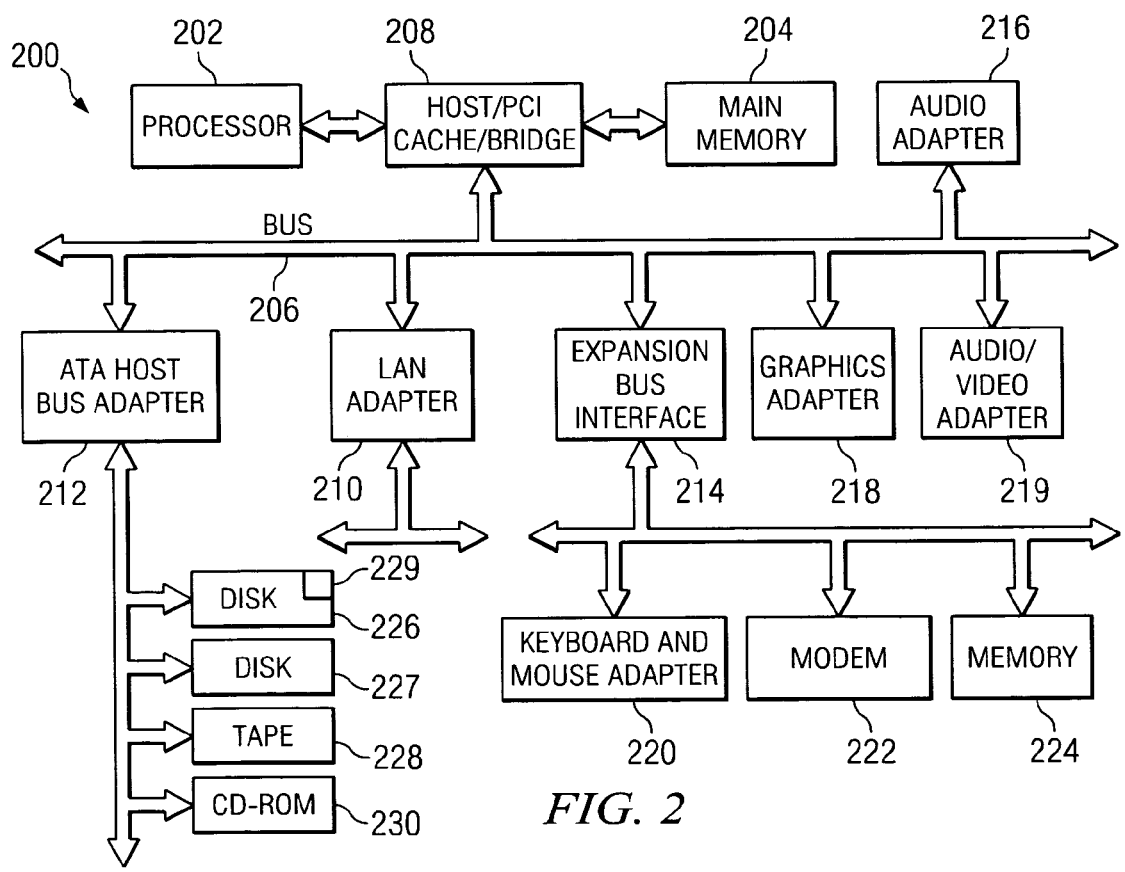
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, Advanced Technology Attachment (ATA) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. ATA host bus adapter 212 provides a connection for hard disk drives 226 and 227, that together comprise a mirrored pair of hard disk drives (RAID 1), tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202. FIG. 2 schematically illustrates an error data structure 229 located on hard disk drive 226, and will be described more fully hereinafter.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include ATA host bus adapter 212, hard disk drives 226 and 227, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226-230.

The present invention provides a method, system and computer program product for reporting and recovering from uncorrectable data errors in a data processing system having an operating system implemented RAID environment and using the ATA or SATA protocol. The present invention provides a mechanism that uses background data scrubbing functionality performed by certain SCSI drives in a manner to provide a high level of data integrity in a RAID environment.

Figure 3:
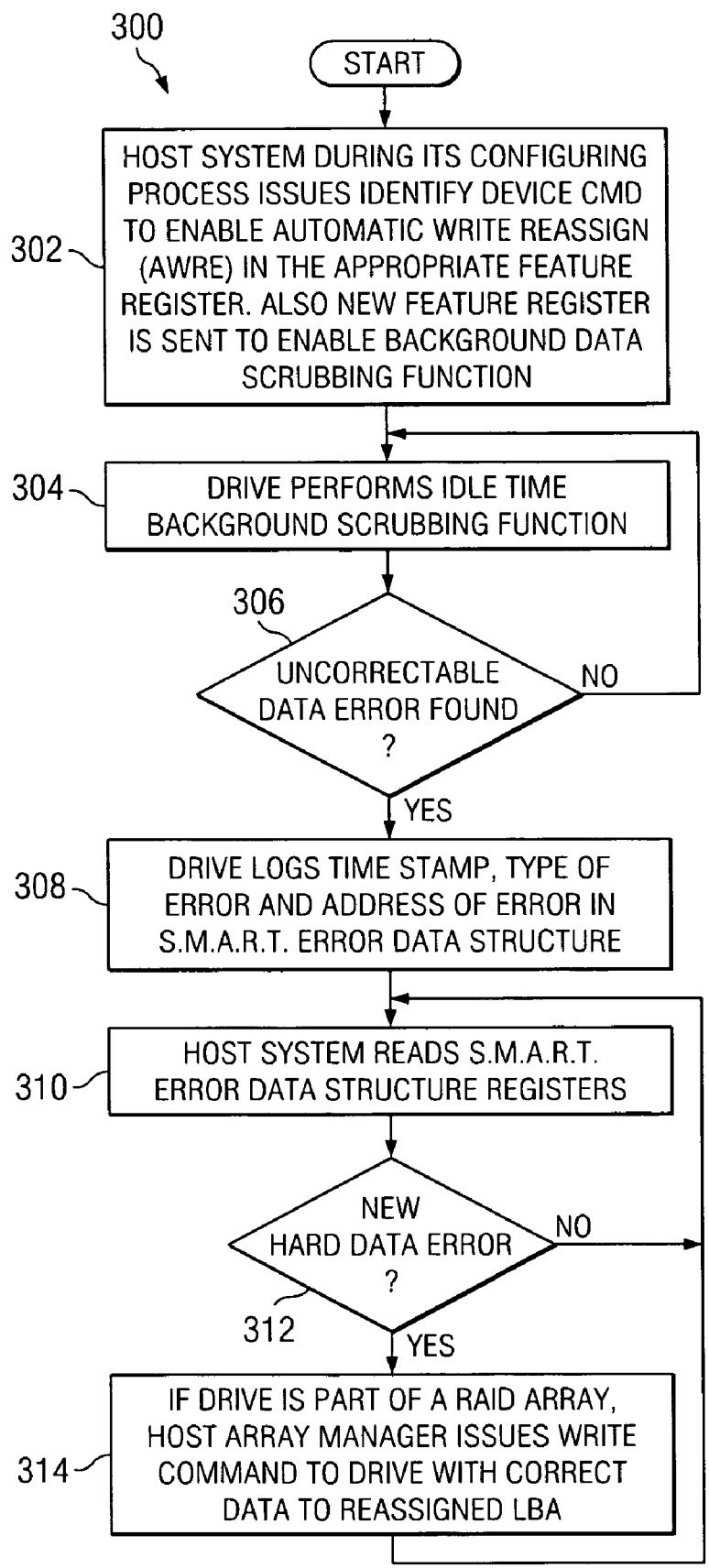
FIG. 3 is a flowchart that illustrates a method for reporting and recovering from data errors in a data processing system in accordance with a preferred embodiment of the present invention.

FIG. 3 is a flowchart that illustrates a method for reporting and recovering from data errors in a data processing system in accordance with a preferred embodiment of the present invention. The data processing system is a system in which RAID functionality is provided by a host operating system, and which uses the ATA or SATA protocol.

The method is generally designated by reference number 300, and begins with the host system enabling an Automatic Write Reassign (AWRE) function, if needed, and an automatic background data scrubbing function during its configuration procedure (Step 302). Drive defaults normally have their AWRE function enabled, and if this function has been enabled, nothing further needs to be done by the host system. If the AWRE function has not been enabled, however, the host operating system issues an Identity Device Command to enable the AWRE function in the appropriate feature register.

The automatic background data scrubbing function is enabled by defining a new feature register bit that is set by the host system.

A hard drive then performs an idle time background scrubbing operation (Step 304). In particular, the scrubbing operation occurs only when the drive is not otherwise being used, i.e., when the drive is not receiving read or write commands.

During the scrubbing operation, it is determined if an unrecoverable data error is found (Step 306). If an unrecoverable error is not found (No output of Step 306), the scrubbing operation continues with no action being taken. If an unrecoverable error is found (Yes output of Step 306), the drive logs a time stamp, the type of error and the address of the error in a S.M.A.R.T. (Self Monitoring Analysis and Reporting Technology) error data structure (Step 308). The S.M.A.R.T. error data structure is schematically illustrated at 229 in FIG. 2 and contains the Logical Block Addresses (LBAs) of each hard error.

The host system periodically reads the S.M.A.R.T. error data structure registers (Step 310), and following each reading, a determination is made if there is a new hard data error entry in the registers (Step 312). The determination is made by comparing the registers to a prior reading established at Array initialization time. If there is not a new hard data error entry (No output of Step 312), the method returns to Step 310. If it is determined that there is a new hard data error entry (Yes output of Step 312), if the drive is a part of a RAID Array, the host Array Manager issues a Write Command to a drive having correct data to write the correct data into the bad LBA that was reassigned (Step 314). The method then returns to Step 310 and the host system continues to periodically read the S.M.A.R.T error data registers. This loop typically continues as long as the system and/or the hard drive has power. In addition, removing the RAID Array through use of the RAID Manager will also disable the loop and terminate the reading function.

Hard Read errors that occur on a drive during normal operation will be added to the table and handled in the same manner as described above.

The present invention thus provides a method, system and computer program product for reporting and recovering from uncorrectable data errors in a data processing system using the ATA or SATA protocol. The invention utilizes the data scrubbing functionality of SCSI hard drives to provide a higher level of data integrity in an operating system implemented RAID environment.

If an uncorrectable data error is found on a hard drive during a background data scrubbing operation, information concerning the data error is logged in a S.M.A.R.T. error data structure. When the host operating system identifies the uncorrectable data error during normal operation, a Host Array Manager issues a Write Command to write the data from a redundant drive after the defective Logical Block Address (LBA) has been reassigned.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system having an operating system implemented RAID functionality, for reporting and recovering from data errors, the method comprising:
   detecting an uncorrectable data error during a background data scrubbing operation;
   logging information concerning the uncorrectable data error in an error data structure;
   identifying the uncorrectable data error logged in the error data structure; and
   issuing, by the operating system, a Write Command to a redundant drive having correct data to write the correct data into a reassigned defective Logical Block Address, wherein the RAID functionality is provided by the operating system in lieu of a RAID adapter.

2. The method according to claim 1, wherein the data scrubbing operation is performed by a hard drive during idle time.

3. The method according to claim 1, wherein the error data structure comprises a Self Monitoring Analysis and Reporting Technology error data structure.

4. The method according to claim 3, wherein logging information concerning the uncorrectable data error in a Self Monitoring Analysis and Reporting Technology error data structure comprises:
   logging a time of the error, a type of the error and the Logical Block Address of the error in the Self Monitoring Analysis and Reporting Technology error data structure.

5. The method according to claim 3, wherein identifying the uncorrectable data error logged in the Self Monitoring Analysis and Reporting Technology error data structure comprises:
   reading the Self Monitoring Analysis and Reporting Technology error data structure, wherein the reading is performed periodically by the operating system; and
   comparing the reading with a prior reading to identify the uncorrectable data error.

6. The method according to claim 5, wherein the reading is performed periodically by the operating system during normal operation of the operating system.

7. The method according to claim 1, wherein the data processing system uses an Advanced Technology Attachment protocol.

8. The method according to claim 1, wherein the Advanced Technology Attachment protocol comprises a Serial Advanced Technology Attachment protocol.

* * * * *